United States Patent
Kovacevic

(10) Patent No.: US 6,907,481 B2
(45) Date of Patent: Jun. 14, 2005

(54) SYSTEM FOR BIT-RATE CONTROLLED DIGITAL STREAM PLAYBACK AND METHOD THEREOF

(75) Inventor: Branko D. Kovacevic, Willowdale (CA)

(73) Assignee: ATI Technologies, Inc., Thornhill (CA)

( * ) Notice: Subject to any disclaimer, the term of this patent is extended or adjusted under 35 U.S.C. 154(b) by 819 days.

(21) Appl. No.: 09/800,226

(22) Filed: Mar. 6, 2001

(65) Prior Publication Data

US 2002/0129155 A1 Sep. 12, 2002

(51) Int. Cl.$^7$ ................................................ G06F 3/00
(52) U.S. Cl. ......................... 710/60; 710/29; 375/243; 370/235
(58) Field of Search ..................... 710/29, 60; 375/273; 370/235, 235.1

(56) References Cited

U.S. PATENT DOCUMENTS

| | | | | |
|---|---|---|---|---|
| 5,159,447 A | * | 10/1992 | Haskell et al. | 375/240.05 |
| 5,974,086 A | * | 10/1999 | Oliboni et al. | 375/225 |
| 5,999,995 A | * | 12/1999 | Ueno et al. | 710/60 |
| 6,009,131 A | * | 12/1999 | Hiramatsu | 375/354 |
| 6,026,074 A | * | 2/2000 | Stadler et al. | 370/395.62 |

* cited by examiner

Primary Examiner—Kim Huynh
(74) Attorney, Agent, or Firm—Toler, Larson & Abel, LLP

(57) ABSTRACT

A system and methods are provided for a controlled transfer of a portion of a data stream between a digital storage media and a corresponding stream decoder. A data stream stored in digital storage media is accessed through an application. A FIFO is used to provide a buffer to the stream decoder. The application monitors the FIFO to determine when to send data related to the data stream from the digital storage media. The data is transferred to the buffer and passed to the stream decoder. A counter is used for dictating a period of time between sending segments of the data stored in the FIFO to the stream decoder. The rate of transfer to the stream decoder is adjusted through the counter to match a desired bit-rate associated with the data stream.

23 Claims, 4 Drawing Sheets

| TD_DATA_CNTL_RW | | | |
|---|---|---|---|
| Field Name | Bits | Default | Description |
| TD_REG_DATA_MODE | 0,1 | '00' | 0= normal operation,<br>1= register input mode.<br>2= bus mastered input mode.<br>3= reserved. |
| TD_DATA_RDY | 2 | '0' | Read only. Software has to check this field for next register write. Otherwise, data would be overwritten and corrupted. |
| TD_SYNC_LOST | 12 | '0' | read only.<br>0= normal operation, 1= data was overwritten. |
| TD_DATA_RW | | | |
| Field Name | Bits | Default | Description |
| TD_DATA | 31:0 | 0x0 | |
| TD_BM_MACRO_CNTL_RW | | | |
| Field Name | Bits | Default | Description |
| TD_BM_RST | 0 | 0x0 | 0= no reset , 1= reset all pointers. |
| TD_BM_LOCK | 1 | 0x0 | 0= normal operation, 1= lock the internal FIFO. |
| TD_BM_DEBUG | 2 | 0x0 | 0= normal operation, 1= snoop into the FIFO (after locking). |
| TD_BM_LEAK_RATE | 15:8 | 0x6 | Control the data consumption from the BM FIFO read side. The value is in terms of MCLK cycles (GUI clock of 75MHz) between bytes. |
| TD_BM_ADDR | 21:16 | 0x0 | BM FIFO address, in lock and debug modes. |
| TD_BM_MACRO_DATA_RW | | | |
| Field Name | Bits | Default | Description |
| TD_BM_MACRO_DATA | 31:0 | 0x0 | |

FIG. 4

SYSTEM FOR BIT-RATE CONTROLLED DIGITAL STREAM PLAYBACK AND METHOD THEREOF

CO-PENDING APPLICATIONS

This invention is related to co-pending patent application entitled "SYSTEM FOR DIGITAL STREAM TRANSMISSION AND METHOD THEREOF", U.S. patent application Ser. No. 09/800,223 filed Mar. 6, 2001.

FIELD OF THE DISCLOSURE

The present invention relates generally to transferring data stream and more primarily to controlling the transfer rate of data streams.

BACKGROUND

Audio and visual components related to compressed Motion Pictures Experts Group (MPEG) data must be properly synchronized for processing. The precise time to present uncompressed data is generally indeterminate relative to the time when the data is received in compressed form. Program clock references that are given during 'stream time' are transmitted in the adaptation field of audio or visual packets or auxiliary data at least ten times every second. A system may establish a reference of which time data should be given to an auxiliary decoder. A conventional system processes data from a data stream to synchronize to the program clock references. The system may then establish a presentation time for a particular data set according to the time the data set is received in reference to other received data sets. Using a stream time determined by the program clock references and the established presentation time, provided with the data set as a presentation time stamp (PTS), the data set is then passed to a decoding system.

A clock local to the decoding system, a system time clock (STC), is used to provide the reference time to compare to the PTS values. The STC is a counter, or clock reference, maintained by the receiving (decoding) system. By comparing the values of the PTS to the system time clock and rendering the data associated with a particular PTS when a match occurs, a decoding system may obtain synchronized presentation of audio and visual data. The STC must be properly synchronized to the clock of the encoding system to properly present the data. Program clock reference (PCR) values are occasionally provided within the transport stream. The STC can set itself to the PCR values to synchronize to the encoding system.

As discussed above, when a decoding system is receiving a data stream from an encoding system, the timing of the decoding system is derived from the encoding system. Known as a "push" model, the data stream is sent at a rate controlled by the encoding system and used by the decoding system to determine timing. Some decoding systems are integrated with a form of digital storage media, such as a hard disk, for storing and/or retrieving data streams. Known as a "pull" model, when a decoding system attempts to process a data stream stored in a digital storage media, the decoding system must dictate the bit-rate for retrieval. However, pull model implementations are usually not bit-accurate. Difficulties are encountered when scheduling digital storage media read requests through an operating system. For example file system delays and disk fragmentation issues lead to inaccurate data stream bit rates. MPEG-2 specifications do not specify a method of controlling bit-rate of transport stream data accessed from digital storage media.

From the discussion above, it is apparent that a system for maintaining an accurate data stream bit-rate during digital storage media access is needed, according to one embodiment of the present invention.

BRIEF DESCRIPTION OF THE DRAWINGS

Specific embodiments of the present invention are shown and described in the drawings presented herein. Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, and wherein:

FIG. 4 is a table illustrating registers for providing control and access of various functions related to the system of FIG. 1, according to one embodiment of the present invention.

DETAILED DESCRIPTION OF THE FIGURES

At least one embodiment of the present invention provides for a method of controlling the transfer of a data stream to a stream decoder. The method includes providing a portion of data in response to a counter value being reached, wherein the counter value is stored in a counter that is being incremented at a predetermined rate. The counter is used to provide a controlled bit-rate related to a transfer of the portion of data. The method includes determining a current bit-rate. The counter is set to a time indicated by a period of the current bit-rate. The method further includes determining a desired bit-rate over an amount of time. In one embodiment, the desired bit-rate is determined according to information associated with the portion of data. The method also includes determining a running average based on the current bit rate and the desired bit rate. The running average is further based on a difference between a plurality of desired bit rates and current bit rates. The method further includes setting the counter value based on the running average. The running average may be used to provide a fine adjustment of the rate at which the portion of data is sent. An advantage of at least one embodiment of the present invention is that a rate controlled transfer of a data stream from memory to a stream decoder is provided.

Figure 1:
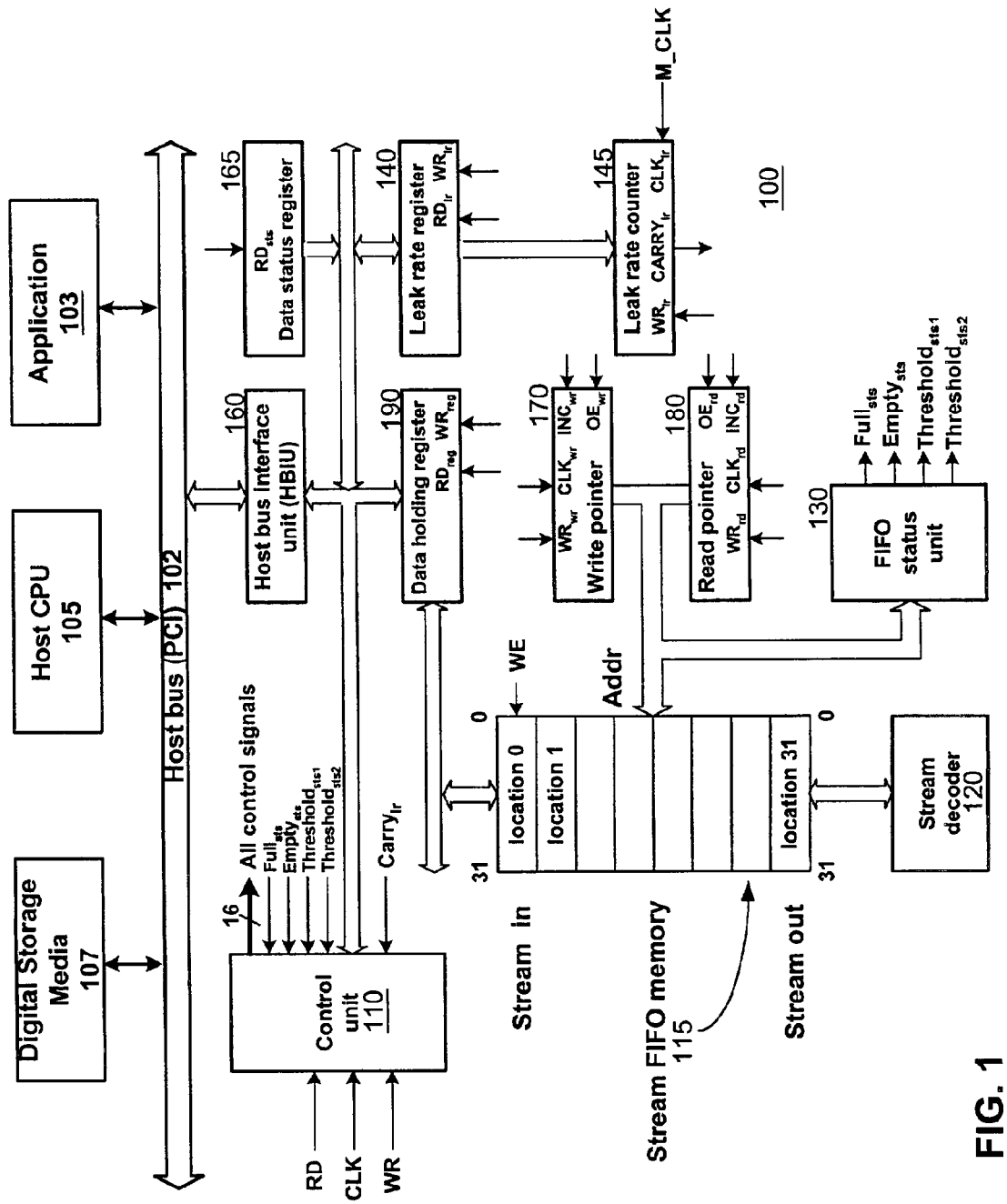
FIG. 1 is a block diagram illustrating a system for handling file scheduling from a digital storage media and controlling a transfer bit-rate to a stream decoder, according to one embodiment of the present invention.

Referring now to FIG. 1, a block diagram illustrating a system for handling file scheduling from a digital storage media and controlling a transfer bit-rate to a stream decoder and is generally referred to as system 100, according to one embodiment of the present invention. A multimedia data stream, such as an MPEG transport stream, is stored in a digital storage media 107. An application 103, attempting to control playback of the transport stream, handles transfer of the transport stream from digital storage media 107 to a stream memory, such as stream first-in-first-out (FIFO) 115.

A control unit 110 monitors the status of system 100 and controls a rate for transferring data from stream FIFO 115 to a stream decoder 120. Application 103 represents a program of instructions for dictating processing to be performed through a host processor, such as host central processing unit (CPU) 105.

Transfer of transport stream data is performed through a host bus interface unit (HBIU) 160 coupled to digital storage media 107 through a data bus, such as peripheral component interconnect (PCI) bus 102. A data-holding register 190 is used to accept a unit of data transferred through HBIU 160. The transfer is initiated from application 103, through host CPU 105. In one embodiment Control unit 110, interrogates internal FIFO buffer and removes a unit of data from data-holding register 190, as soon as there is a storage location available inside internal FIFO. This is suitable for block based, DMA like, hardware controlled data transfers with minimum software overhead. In other embodiment, application 103 interrogates a data status register 165 to determine if data-holding register 190 is empty and able to accept new data. This is used in software driven parallel input-output mode (PIO mode). In one embodiment, a field associated with data status register 165 is used to indicate data-holding register 190 is busy or full. In one embodiment, the current value of data status register 165 is asserted through control unit 110. Control unit 110 programs data status register 165 with the current value through an RD_STS control signal. Control signals RD_REG and WR_REG are used for read and write access to data-holding register 190, respectively.

Besides reflecting the status of data-holding register 190, data status register 165 may be used to reflect the status of stream 115 FIFO as well. For example, in one embodiment, data status register is used to indicate one of four conditions. A first condition indicated stream FIFO 115 is empty, meaning all the data from stream FIFO 115 has been read. A second condition may be used to indicate the mount of data in stream FIFO 115 has fallen below a first threshold, indicating that stream FIFO 115 is nearly empty. A third condition may be used to indicate the amount of data in stream FIFO has surpassed a second threshold, indicating stream FIFO 115 is nearly full. A fourth condition may be used to indicate stream FIFO 115 is full.

In one embodiment, a FIFO status unit 130 generates status information regarding warnings of an empty or full internal FIFO, or of 'half-full' condition based on a single threshold, or a 'low watermark' and a 'high watermark' condition if dual thresholds are used. FIFO status unit 130 determines the state of stream FIFO 115 by monitoring write signals, such as WR_WR or WR_RD, increment signals, such as INC_WR and INC_RD, and output enable signals, such as OE_WR and OE_RD. FIFO status unit 130 also monitors the values of FIFO write pointer 170 and read pointer 180. FIFO status unit 130 may contain combinatorial logic to determine the status of stream FIFO 115. In one embodiment, FIFO status unit 130 output a set of four signals corresponding to status conditions of stream FIFO 115, wherein a FULL_STS signal indicates stream FIFO 115 is currently full, EMPTY_STS indicates stream FIFO 115 is currently empty, THRESHOLD_STS1 indicates stream FIFO 115 is near empty and THRESHOLD_STS2 indicates stream FIFO 115 is nearly full. FIFO status unit 130 keeps track of available storage locations of stream FIFO 115 by tracking read or write operations by an counter (not shown) internal to FIFO status unit 130. The internal counter is incremented by a write operation, decremented by a read operation and left unchanged if simultaneous read and write operations occur.

In one embodiment, read pointer 180 and write pointer 170 are stored in 5-bit binary up-counters, providing an addressing capability for a 32 random access memory (RAM) locations of stream FIFO 115. Read operations increment read pointer 180 and write operations increment write pointer 170. In one embodiment, if the last operation was a read operation, and the values of read pointer 180 and write pointer 170 are equal, stream FIFO 115 is considered empty by FIFO status unit 130. If the last operation was a write operation, and read pointer 180 and write pointer 170 are equal, stream FIFO 115 is considered full. In all other cases, stream FIFO 115 is not considered full or empty. Write operations are ignored when stream FIFO 115 is considered full, and read operations are ignored when stream FIFO 115 is considered empty. An INC_RD and an INC_WR signal are generated per every read and write operation, respectively. An OE_RD signal and an OE_WR signal are generated to allow data addressing and data access to internal RAM locations of stream FIFO 115, when a read request originates from stream decoder 120 or HBIU 160, respectively. A CLK_WR signal and a CLK_RD signal are used with write pointer 170 and read pointer 180 to allow content from stream FIFO 115 to be obtained from any internal RAM location.

A leak rate register 140 is used to preset a full cycle value for a leak rate counter 145. In one embodiment, leak rate register 140 is set through registered RD_LR and WR_LR signals. Leak rate register 140 allows application 103, through host CPU 105, to control and alter the speed of data consumption from stream FIFO 115, by presetting a roll-off value of leak rate counter 145. A roll-off indicator, CARRY_LR signal of leak rate counter 145, is used to start the transfer of one data element from stream FIFO 115 to an input buffer (not shown) of stream decoder 120, when a roll-off count determined by leak rate register 140 is reached. Leak rate counter 145 is clocked from an internal clock source M_CLK, such as a 2-dimensional (2 D) graphic user interface (GUI) engine clock (not shown), running at 75 MHz. Every time the roll-off value is reached, a CARRY_LR signal pulse is generated. Under control of this pulse, a byte of data from stream FIFO 115 is transferred to an input buffer (not shown) of stream decoder 120.

In one embodiment, control unit 110 generates the control signals allowing register access, write or read operations on FIFO pointers 170 and 180, addressing of stream FIFO 115, and the transfer of data to and from stream FIFO 115. In one embodiment, the outputs of control unit 110 are registered. Control unit 110 may be implemented as sequential, combinatorial logic or as a micro-programmable device.

In one embodiment, write operations to stream FIFO 115 are enabled through a WE signal, initiated through control unit 110. In one embodiment, stream FIFO 115 represents a 32-bit wide, 32-element memory buffer. It should be appreciated that other memory buffer types may be used, such as 8-, 16-, or 64-bit wide FIFOs. A FIFO with more elements may also be included, such as containing 32, 64, or 128 elements within stream FIFO 115. In one embodiment, stream FIFO 115 is a dual channel FIFO. Read and write operations to stream FIFO may occur concurrently, utilizing separate channels or data busses.

In one embodiment, stream decoder 120 includes an MPEG data decoder for processing various program stream data fields from the transport stream stored in digital storage media 107, such as data related to program specific information (PSI) and system information (SI) tables. Stream decoder 120 may also include other data stream decoders, such as an MPEG system decoder, an MPEG audio decoder, or MPEG video decoder, without departing from the scope of the present invention. In one embodiment, a data rate monitor is used to track the bit-rate of data sent from stream FIFO 115 to stream decoder 120. The data rate monitor is used to adjust the roll-off value stored in leak rate register 140, used by leak rate counter 145. By adjusting the roll-off value, the data rate monitor may achieve a fine-tuning of the bit-rate. The data rate monitor may be implemented through software, such as in application 103, or through hardware, such as in control unit 110.

Figure 2:
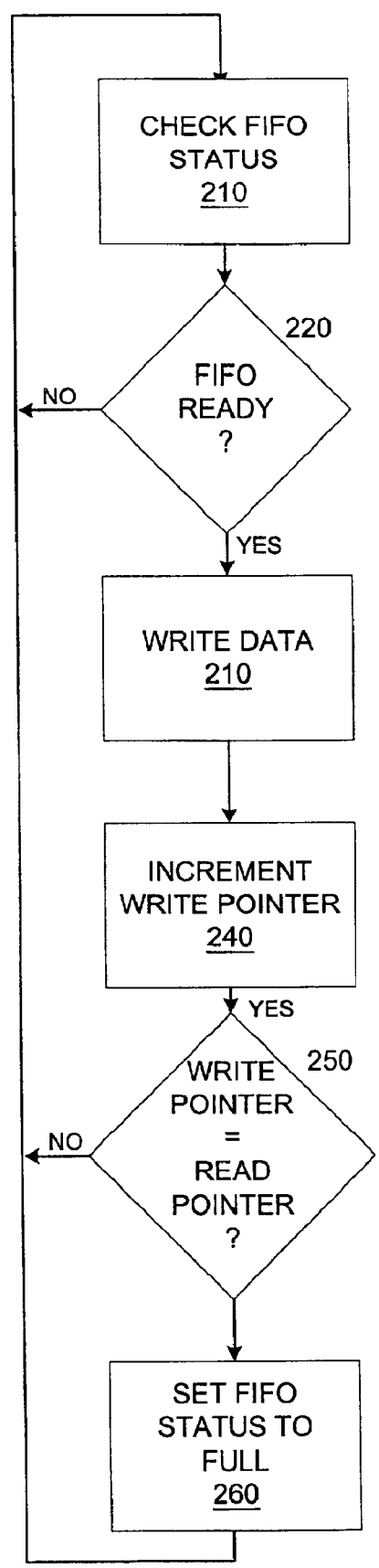
FIG. 2 is a flow diagram illustrating a method of transferring data stream data from a digital storage media to a stream FIFO, according to one embodiment of the present invention.

Referring now to FIG. 2, a flow diagram illustrating a method of transferring data stream data from a digital storage media to a stream FIFO is shown, according to one embodiment of the present invention. In one embodiment, an application accessed transport stream data from a digital storage media, such as a hard disk, floppy disk, compact disc (CD) read-only memory (ROM), digital versatile disk (DVD) ROM, or through a network interface. In one embodiment, the transport stream data must be provided to a stream decoder for processing. A FIFO, such as stream FIFO 115 (FIG. 1) is used to buffer the transport stream data to allow control of a bit rate related to the transfer of the data to the stream buffer to be performed.

In step 210, the application, such as application 103 (FIG. 1), checks the status of the FIFO. In one embodiment, a holding register is used to store the value of data being placed on the FIFO. A status register is monitored by the application to determine the status of the holding register and the FIFO. The status may indicate whether the holding register is empty, ready for more data, or whether the holding register is busy, indicating it is currently being used to store data on the FIFO. In one embodiment, the status includes information regarding the fullness of the FIFO, indicating if the FIFO is nearly empty or nearly full. The application program may alter a rate in which data is written to the FIFO to allow the FIFO to be filled or drained appropriately. In step 220, it is determine if the FIFO is ready for more data. For example, an indication that the holding register is empty may be used to indicate the FIFO is ready to accept more data. In step 220, if the FIFO is not ready, the application returns to state 210, monitoring the status of the FIFO. If the FIFO status indicates the FIFO is ready for more data, the application transitions to state 230.

In state 230, new data is written to the FIFO. The application places the data in the holding register. A control unit, such as control unit 110, may be used to allow the data in the holding register to be written to the FIFO. The data is stored in a location of the FIFO indicated through a write pointer. In step 240, the write pointer is incremented to point to the next location of the FIFO where new data will be placed. In step 250, the value of the write pointer is compared to a value of a read pointer. The read pointer is used to indicate the location of the FIFO where data is read and transferred to the stream decoder. In step 260, if the values of the write and read pointers are equivalent, the FIFO is considered full. The FIFO status is updated to indicate the FIFO is full and the application returns to step 210, awaiting a change in the status of the FIFO to write in a new data. The FIFO remains full until a read operation is performed to allow the FIFO to empty. In step 250, if the write and read pointers were not equal, the status of the FIFO is left unchanged and the application returns to step 210, to monitor the status of the FIFO and prepare to send new data.

Figure 3:
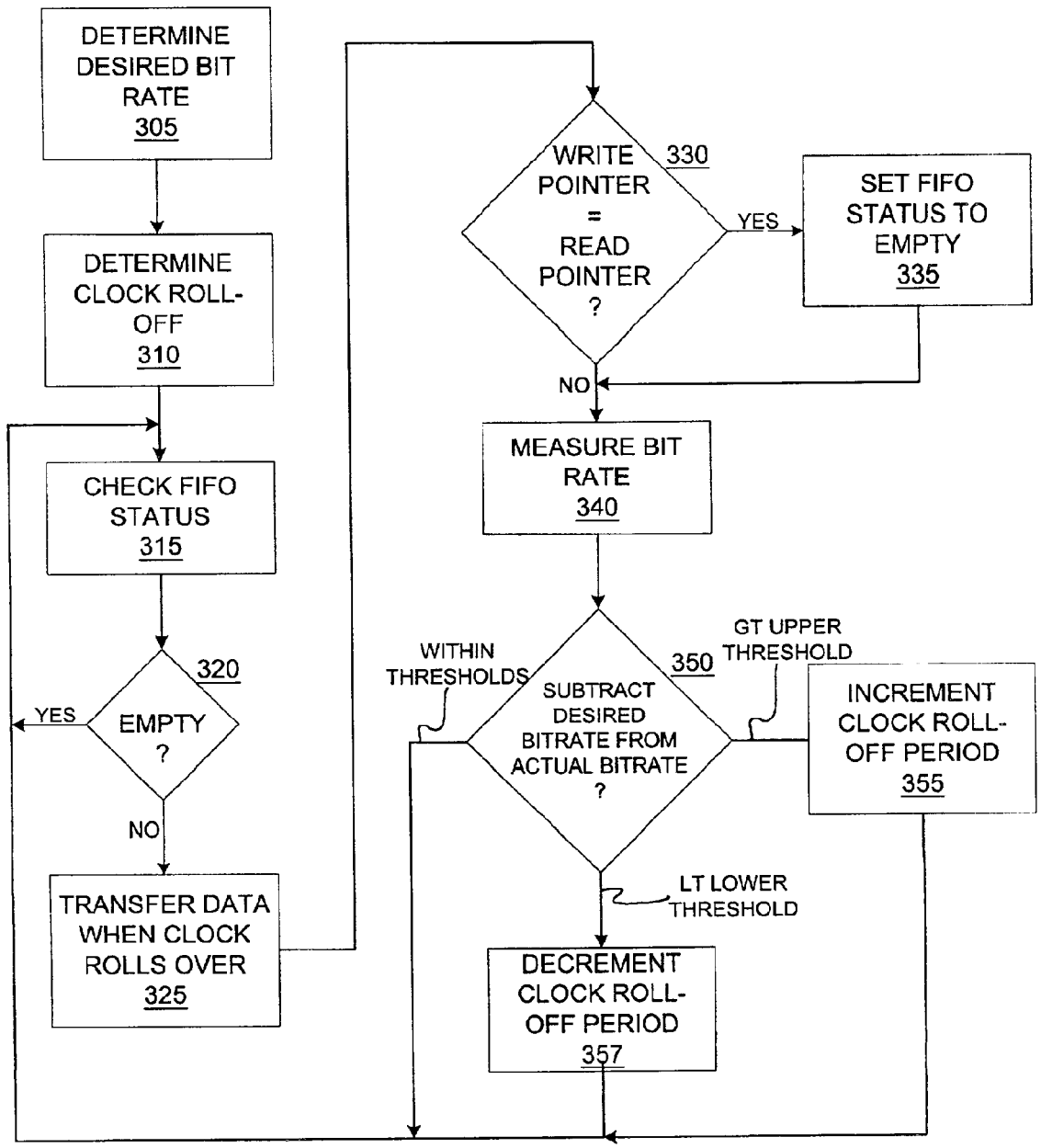
FIG. 3 is a flow diagram illustrating a method of transferring data stream data from a stream FIFO to a stream decoder, according to one embodiment of the present invention.

Referring now to FIG. 3, a flow diagram illustrating a method of transferring data stream data from a stream FIFO to a stream decoder is shown, according to one embodiment of the present invention. Data is stored in a FIFO by an application, as described in FIG. 2. The transfer rate of the data from the FIFO to the stream decoder is monitored and adjusted through a data rate monitor to allow the data rate to resemble a desired data rate associated with a transport stream associated with the data.

In step 305, a desired bit-rate is determined. The desired bit is set to a value as part of a course adjustment performed to provide data to the stream decoder at a proper bit-rate associated with the stored data. In one embodiment, the desired bit-rate is determined through values associated with the data already transferred to the stream decoder. For example, if the data is related to transport stream packets, the desired bit-rate may be calculated by comparing an amount of data transferred between a first and a second program clock reference (PCR) embedded in the transport stream packets. The coarse adjustment described for the case of transport stream packets is described in further detail in reference to a specific embodiment of a pending patent application entitled "SYSTEM FOR DIGITAL STREAM TRANSMISSION AND METHOD THEREOF", and application Ser. No. 09/800,223 which is herein incorporated by reference. If the data is related to elementary stream (ES) data, a bit_rate_value bit-field associated with a data header may be monitored to identify the desired bit-rate. If the data is related to packetized ES (PES) packets, an ES_rate bit-field may be used to identify the desired data rate. The selected method provides a course bit-rate determination. If no previous data has been received by the data stream to determine a bit-rate as described herein or if no other method of determining the desired bit-rate is available, the desired bit-rate may be set to a predetermined value, such as to a value of an average bit-rate.

In step 310, a clock roll-off value is calculated based on the desired bit-rate. In one embodiment, the roll-off period is used to indicate a period of time between transfers of data to the stream decoder. In one embodiment, the clock roll-off period indicates the point in which a bit-rate control counter resets to zero and transmits a CARRY signal to indicate the completion of a period of time related to the roll-off period. The CARRY signal is used to trigger a transfer of a data segment from the FIFO. In one embodiment, the clock roll-off period is calculated using the following equation, wherein N refers to the value of the clock roll-off period, F_M_CLK refers to the frequency of a clock signal provided to the bit-rate control counter, and DESIRED_BIT_RATE refers to the desired bit-rate determined in step 305.

In step 315, the current status of the FIFO is checked. In one embodiment, the FIFO status is checked through a FIFO status register. In step 320, it is determined if the FIFO status indicated the FIFO was empty. If the FIFO is empty, the system returns to step 315, to continue to monitor the status of the FIFO until new data is available. If the FIFO was not empty, the system continues to step 325. In step 325, the next segment of data in the FIFO is transferred to the stream buffer when the bit-rate control counter completes a clock roll-off period. In step 330, the value of the write pointer is compared to the value of the read pointer. If the values of the two pointers are equivalent, the FIFO is considered empty and the system proceeds to step 335 where the FIFO status is updated to indicate that the FIFO is empty. If the two pointer values were not equivalent in step 330, or once step 335 is complete, the system transitions to step 340.

In step 340, the actual bit-rate of the data transferred to the stream decoder is determined. The actual bit-rate may be determined by calculating the amount of data transferred within a particular period of time, divided by the particular period of time. In step 350, the value of the actual bit-rate is subtracted from the desired bit-rate. If the difference is positive and greater than a predetermined upper threshold, the clock roll-off period is adjusted through an increment of one clock value, as in step 355. If the difference calculated in step 350 is negative and less than a lower threshold, the clock roll-off period is adjusted through a decrement of one clock value, as in step 357. Steps 355 and 357 represent a fine-adjustment of the transfer bit-rate to achieve the true desired bit-rate over time.

Other method of adjusting the bit-rate, or clock roll-off period value may be performed. In one embodiment, the bit-rates associated to a number of data samples are taken to determine an average bit-rate. As the bit-rate may be hindered through various system artifacts, such as hard disk access or processing performed for other applications, an average bit-rate may be used to generate a gradual adjustment which is not affected by random system anomalies which may temporarily affect the bit-rate. The bit-rate measurement, in either method discussed, may be performed every 10 ms or every 100 ms.

Referring now to FIG. 4, a table illustrating registers for providing control and access of various functions related to the system of FIG. 1 is shown, according to one embodiment of the present invention. A TD_DATA_CNTL register is used to provide access to data streaming modes available. A TD_DATA register is used for transferring transport packet data into stream FIFO 115 (FIG. 1). A TD_BM_MACRO_CNT register is used to provide control for a bus-mastered input data transfer. A TD_BM_MACRO_DATA register is used for providing data being bus-mastered into stream FIFO 115.

A TD_REG_DATA_MODE field of the TD_DATA_CNTL register is used to define a particular mode of operation. A value of '0' to the TD_REG_DATA_MODE field indicates normal operation. A value of '1' is used to indicate a register input mode, wherein data is transferred into stream FIFO 115 through a holding register. A value of '2' is used to indicate a bus-mastered input mode and a value of '3' is reserved for specific implementations. A TD_DATA_RDY field is used for software, such as application 103 (FIG. 1) may determine whether or not the holding register is ready to accept new data. If the register is not ready, the old data stored to the holding register may be overwritten with new data, corrupting a data stream being stored. A TD_SYNC_LOST field may be used to indicate whether data in the holding register was overwritten (indicated with a value of '1') before being properly transferred to stream FIFO 115, or whether the system is currently undergoing normal operation. If data has been overwritten, the data stream being stored may have become corrupt and may have to be cleared from stream FIFO 115.

A TD_BM_RST field of the TD_BM_MACRO_CNTL register may be used to reset the read and write pointers to stream FIFO 115, by asserting a value of '1' to the TD_BM_RST field. A TD_BM_LOCK field may be used to lock transfers into the FIFO. A TD_BM_DEBUG field may be used to enable a snooping mode, in which the values of segments of stream FIFO may be monitored. A TD_BM_LEAK_RATE field may be used to set the consumption rate, which is the rate at which data is read from stream FIFO 115. The value to be stored in the TD_BM_LEAK_RATE field indicated a number of clock cycles between data segment reads from stream FIFO 115. A TD_BM_ADDR field is used to set a bus-master FIFO address, for lock and debug modes, such as the snooping set through TD_BM_DEBUG. It will be appreciated that other registers and register fields may be provided to control various functions of system 100, and that the addition of such functions may be made without departing from the scope of the present invention.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that while components of the system have been describes in reference to video and audio processing components, the present invention may be practiced using other types of system components. It should be appreciated that the system described herein has the advantage of providing bit-rate control during digital stream playback.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method of comprising:
   providing a portion of data in response to a counter value being reached, wherein the counter value is stored in a counter that is being incremented at a predetermined rate;
   determining a current bit rate;
   determining a desired bit rate over an amount of time;
   determining a running average based on the current bit rate and the desired bit rate, wherein the running average is further based on a difference between a plurality of desired bit rates and current bit rates; and
   setting the counter value based on the running average.

2. The method of claim 1, wherein determining and setting are repeated at a predetermined interval rate.

3. The method of claim 2, wherein the predetermined interval less than approximately 150 milliseconds.

4. The method of claim 2, wherein the predetermined interval less than approximately 10 milliseconds.

5. The method of claim 1, wherein setting the counter value includes using the running average to access a counter value stored in a table.

6. The method of claim 1, wherein setting the counter value includes using the running average in an equation to determine the counter value.

7. The method of claim 1, wherein the data is a portion of a packetized multimedia data stream.

8. The method of claim 1, wherein the portion of data is a data word having a predetermined width.

9. The method of claim 1, wherein the counter value is stored in a register of a first data processor, and setting the counter is performed by a host data processor that is different than the first data processor.

10. The method of claim 1 further including initializing the counter value to a first count based on a calculated time difference, wherein the calculated time difference is based on clock values stored in the data.

11. The method of claim 10, wherein the first count is further based upon an amount of data stored between the clock values used to determine the time difference.

12. The method of claim 10, wherein providing includes providing the portion of data to an MPEG audio decoder.

13. The method of claim 10, wherein providing includes providing the portion of data to the MPEG video decoder.

14. A method of comprising:
   reading a portion of data in response to a counter value being reached, wherein the counter value is stored in a counter that is incremented at a predetermined rate;
   determining a current bit rate;
   determining a desired bit rate over an amount of time;
   determining a difference between the current bit rate and the desired bit rate;
   increasing the counter value when the difference is greater than a predefined value; and
   decreasing the counter value when the difference is negative.

15. The method of claim 14, wherein the data is a portion of a packetized multimedia data stream.

16. The method of claim 14, wherein the portion of data is a data word having a predetermined width.

17. The method of claim 14, wherein setting the counter is repeated at a rate less than the predetermined amount of time.

18. The method of claim 14, wherein setting the counter occurs at a repeated interval.

19. A system comprising:
   a system bus port to couple to a system bus;
   a system clock;
   a memory configured as a first in first out memory (FIFO) coupled to a data holding register;
   a first register coupled to the memory to store a current write location of the memory;
   a second register coupled to the memory to store a current read location of the memory; and
   a leak rate controller coupled to the memory to control a rate at which data is read from the memory, the leak rate controller further including
   a data rate monitor to determine a current data rate;
   a counter coupled to the system clock to provide a read signal when a predefined value is met, wherein the read signal is for accessing data stored in the memory.

20. The system of claim 19, wherein the leak rate controller further includes a filter coupled to the data rate monitor to determine a running average of a difference between the current data rate and a desired data rate.

21. The system of claim 19 further comprising an audio decoder coupled to the memory.

22. The system of claim 20 further comprising a video decoder coupled to the memory.

23. The system of claim 19 further comprising a video decoder coupled to the memory.

* * * * *